No. 850,065. PATENTED APR. 9, 1907.
H. SHOEMAKER.
HIGH POTENTIAL MEASURING INSTRUMENT.
APPLICATION FILED OCT. 29, 1906.
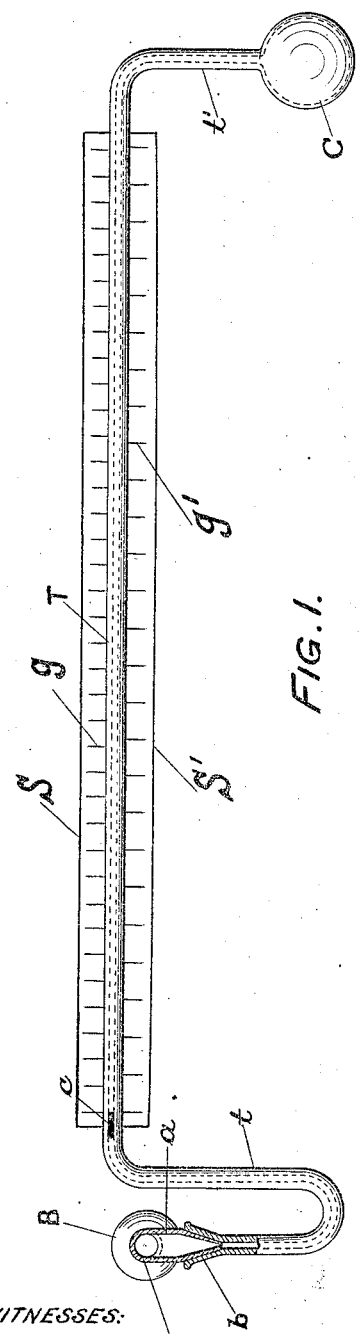
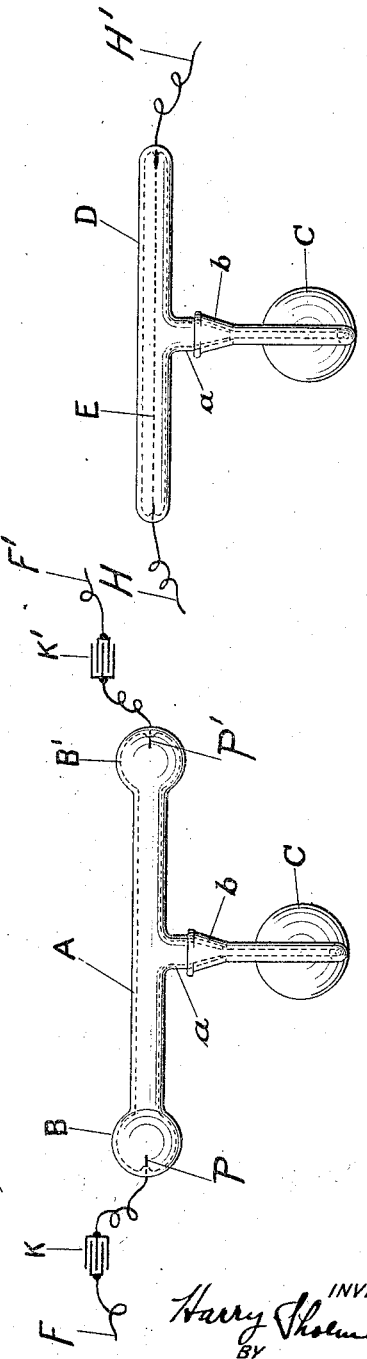

UNITED STATES PATENT OFFICE.

HARRY SHOEMAKER, OF JERSEY CITY, NEW JERSEY.

HIGH-POTENTIAL-MEASURING INSTRUMENT.

No. 850,065.  Specification of Letters Patent.  Patented April 9, 1907.

Application filed October 29, 1906. Serial No. 340,962.

*To all whom it may concern:*

Be it known that I, HARRY SHOEMAKER, a citizen of the United States, residing at Jersey City, in the county of Hudson and State of New Jersey, have invented a new and useful High-Potential-Measuring Instrument, of which the following is a specification.

My invention relates to an instrument for measuring the potential, pressure, or voltage, or the current magnitude of high-tension or high-potential electric apparatus—such as high-potential transformers, oscillatory circuits, spark-circuits, static machines, X-ray apparatus—and, in fact, any apparatus producing or utilizing electric currents or charges of such potentials as to be beyond the range of ordinary galvanometers, dynamometers, or other measuring instruments.

My improved measuring instrument is well adapted to measure potentials or currents occurring in wireless telegraph-transmitting apparatus, X-ray apparatus, or high-tension-power transmission, &c.

It is the object of my invention to provide an instrument which will give direct readings or readings for use with a calibration curve of high potentials or the currents in such high-potential circuits as aforementioned.

To this end my invention resides in closed bulbs or chambers connected by a tube of relatively small bore and containing a seal, such as a small mass of suitable liquid, the portion of the system to one side of the seal being subjected to the electrical effects of a circuit whose quantities are to be measured, the system to the other side of the seal serving to oppose the movement of the seal until equilibrium is reached.

For an illustration of several forms my invention may take reference is to be had to the accompanying drawings, in which—

Figure 1 is a longitudinal view of the potential or voltage measuring instrument as assembled, part being shown in section. Fig. 2 is an end view of the apparatus shown in Fig. 1. Fig. 3 is an end view showing an arrangement for measuring the current quantities of a high-potential or other circuit.

Referring to the drawings, T is a tube, preferably of glass, having a relatively slight bore—such, for example, as a thermometer-tube. This connects at the right-hand end by a small limb $t'$ with the bulb C, and similarly at the left-hand end by the limb $t$ with the bulbs B and B', which are connected together by the tube A, having a bore of considerable size. The tube A has a downwardly-extending neck $a$, which is drawn out into a cone and ground to fit accurately in the ground funnel-shaped termination $b$ of the limb $t$. The joint is hermetically sealed by any suitable substance. A small mass of liquid, preferably colored for the purpose of easily reading deflections, is shown at $c$ in a tube of small bore. In the drawings the bore of tube T is exaggerated for the purpose of illustration. The volume of the bulb C is very great compared to the volume of the thermometer-tube, and the same is true of the combined volumes of the bulbs B and B' with the tube A.

Sealed into the bulb B is a terminal P, preferably of platinum or tantalum wire—say No. 28 B. and S. gage—and a similar terminal P' is sealed into the bulb B'. This sealing in of platinum or like terminals is well understood in the art of incandescent-lamp manufacture. The terminal P communicates, through the condenser K, with the one terminal F of the instrument. Similarly, the terminal P' communicates, through condenser K', with the other terminal F' of the instrument.

The gas filling the system of bulbs and connecting-tubes may be air at ordinary atmospheric pressure or at any other suitable pressure, or any other suitable gas or vapor may be employed either at atmospheric pressure or at some other pressure.

With the system sealed up (by sealing the joint between neck $a$ and funnel $b$) and connecting the terminals F and F' to the points of the circuit between which the potential is to be measured a discharge occurs between the terminals P and P', causing a rise in temperature in the immediately-surrounding gas. There results an expansion of the gas in the bulbs B and B' and the tube A which forces the small mass of liquid or seal $c$ to the right as viewed in Fig. 1, thereby compressing the gas in the thermometer-tube T and limb $t'$ and the bulb C. The liquid $c$ continues this movement until a balance of pressure between the left-hand system and the right-hand system is reached. Then the potential is read off on the scale S, having graduations $g$. The scale S may be graduated to read directly in volts, the units of the scale being hundreds or even thousands of volts, according to conditions, or a calibration curve may be used in connection with the scale-readings.

Either one or both of the condensers K K' may be entirely omitted. They serve to restrain the amount of discharge through the tube A when the instrument is used in connection with circuits of exceptionally high potentials. If the potential to be measured is that of a perfectly continuous current—that is, not in the form of impulses, oscillations, or alternations—the condensers K K' are preferably supplanted by extremely high resistances.

A second scale S', having graduations q', is provided for a case where one or both of the condensers are omitted. In other words, the instrument is a double-scale instrument, one scale being used for one range of potentials, the other scale being used for another range of potentials. By different values of the capacity of either of the condensers K K' different calibrations are obtained and different ranges given to the instrument.

The distance between the terminals P P' and the nature and pressure of the gas are preferably so chosen that a direct spark discharge does not take place. It is preferred that the invisible discharge or a brush discharge only be permitted. With the volumes of the right and left hand systems very great as compared to the volume of the thermometer-tube the instrument will give deflections proportionate to the potentials, and the arrangement here shown requires no correction for temperature changes of the surrounding atmosphere, particularly when the volumes of the two systems to the right and left of the seal c are equal or very nearly equal.

In Fig. 3 the ammeter arrangement is shown. The terminals H and H' are sealed into the ends of the tube D of relatively large bore and are connected by a German-silver or other wire E of, say, No. 40 B. and S. gage for small currents. Here the heat developed in the wire E by the passage of the current to be measured causes an expansion similar to the expansion caused in the voltmeter in Figs. 1 and 2 by the discharge. In other respects the instrument is similar to the voltmeter.

It is to be understood that I do not confine my invention to the form of apparatus here illustrated, for other dispositions of the various parts may be adopted without varying the principle or the results, and sizes of terminals P and P' and of wire E may be chosen different from those herein mentioned.

What I claim is—

1. In an electrical measuring instrument, chambers of practically equal volumes communicating through a tube of relatively small bore, separated terminals in one chamber adapted to have a discharge passed between them and a seal adapted to move in said tube of small bore to indicate restoration of equilibrium after the passage of discharge between said terminals.

2. In an electrical measuring instrument, a tube of relatively small bore, a seal adapted to move therein, a chamber communicating with said tube, and circuit-terminals separated from each other within said chamber and adapted to have a discharge passed between them.

3. In an electrical measuring instrument, the combination with a tube having a small bore, of a seal adapted to move therein, a chamber communicating with said tube, and electrical terminals separated from each other in said chamber and connected by a gas or vapor path.

4. In an electrical measuring instrument, the combination with chambers of practically equal volumes, of a tube of relatively small bore connecting the same, a seal adapted to move in said tube, circuit-terminals in one of said chambers, and a gas or vapor path bridging said terminals.

5. In an electrical measuring instrument, the combination with chambers of practically equal volumes, a tube of relatively small bore connecting said chambers, a seal adapted to move in said tube, one of said chambers comprising communicating bulbs, circuit-terminals disposed in said bulbs, and a gas or vapor path bridging said terminals.

6. In an electrical measuring instrument, the combination with a tube of small bore, of a seal movable therein, a chamber having separated circuit-terminals, a gas or vapor bridging said terminals for absorbing electrical energy to produce heat, and a ground-glass connection between said chamber and tube.

7. In an electrical measuring instrument, a tube of relatively small bore, a seal movable therein, a chamber communicating with said tube, a second chamber communicating with said tube, separated electrical terminals in said second chamber, means bridging said terminals to absorb electrical energy, and current-restraining means external to said chamber and in circuit with said terminals.

8. In an electrical measuring instrument, a tube of relatively small bore, a seal movable therein, a chamber communicating with said tube, a second chamber communicating with said tube, separated electrical terminals in said second chamber, means bridging said terminals to absorb electrical energy, and a condenser in circuit with said terminals.

9. In an electrical measuring instrument, the combination with chambers of practically equal volumes, a tube of small bore connecting said chambers, a short seal movable in said tube, a scale-plate associated with said tube whereby readings may be made from movement of said seal, separated electrical terminals in one of said chambers, and a gas or vapor path bridging said terminals.

10. In an electrical measuring instrument, glass chambers of practically equal volumes, a glass connecting-tube of small bore, a movable seal in said connecting-tube, one of said chambers being detachable from said tube, separated electrical terminals in said chamber, and a gas or vapor path bridging said terminals.

In testimony whereof I have hereunto affixed my signature in the presence of the two subscribing witnesses.

HARRY SHOEMAKER.

Witnesses:
ELIZABETH DUFFY,
JAMES M. SAWYER.